United States Patent [19]
Pircon

[11] 3,957,465
[45] May 18, 1976

[54] POLLUTION CONTROL APPARATUS AND METHOD

[76] Inventor: Ladislav J. Pircon, 305 Canterbury Lane, Oak Brook, Ill. 60521

[22] Filed: May 6, 1974

[21] Appl. No.: 467,083

Related U.S. Application Data
[63] Continuation-in-part of Ser. No. 252,914, May 12, 1972.

[52] U.S. Cl. ...................................... 55/90; 55/94; 55/242; 55/257 NP; 55/446; 55/465; 261/116; 261/DIG. 54
[51] Int. Cl.² ........................................ B01D 47/06
[58] Field of Search ............ 55/1, 93, 94, 242, 241, 55/257, 444–446, 462–465; 261/116, DIG. 54, 78 A

[56] References Cited
UNITED STATES PATENTS

| | | | |
|---|---|---|---|
| 151,279 | 5/1874 | Egan | 55/462 |
| 1,527,235 | 2/1925 | Taylor | 55/1 |
| 1,964,357 | 6/1934 | Ketterer | 261/116 |
| 2,032,404 | 3/1936 | Fisher | 261/DIG. 54 |
| 2,090,994 | 8/1937 | Brandes | 261/116 |
| 2,523,126 | 9/1950 | Long | 261/DIG. 78 A |
| 3,606,738 | 9/1971 | Kraus, Jr. | 55/465 |

FOREIGN PATENTS OR APPLICATIONS

| | | | |
|---|---|---|---|
| 23,921 | 1910 | United Kingdom | 261/116 |
| 238,014 | 2/1911 | Germany | 55/462 |
| 80,375 | 9/1918 | Switzerland | 55/332 |
| 587,316 | 10/1924 | France | 55/419 |

*Primary Examiner*—Bernard Nozick
*Attorney, Agent, or Firm*—Thomas W. Speckman

[57] ABSTRACT

Apparatus operating at low pressure drop and low initial velocity for removing pollutants down to submicron sizes from gas streams comprising a nozzle of specified dimensions within a vertical casing and an impingement means below the nozzle outlet wherein the pollutant containing gas stream passes into the upper portion of a vertical casing and through the nozzle within the casing, the acceleration and deceleration of the gas stream causing particulates to agglomerate in passing through the nozzle, impinging the agglomerates upon the impingement means, removing the liquid and particulate matter from the lower portion of the casing and separately removing the clarified gas from the lower portion of the casing. An apparatus and method is disclosed wherein 2 to 6 nozzle-impingement means stages are connected in vertical series and wherein 2 to 6 nozzles are placed in each vertical stage and 2 to 4 of the mulitple nozzle-impingement means stages are connected in series.

19 Claims, 3 Drawing Figures

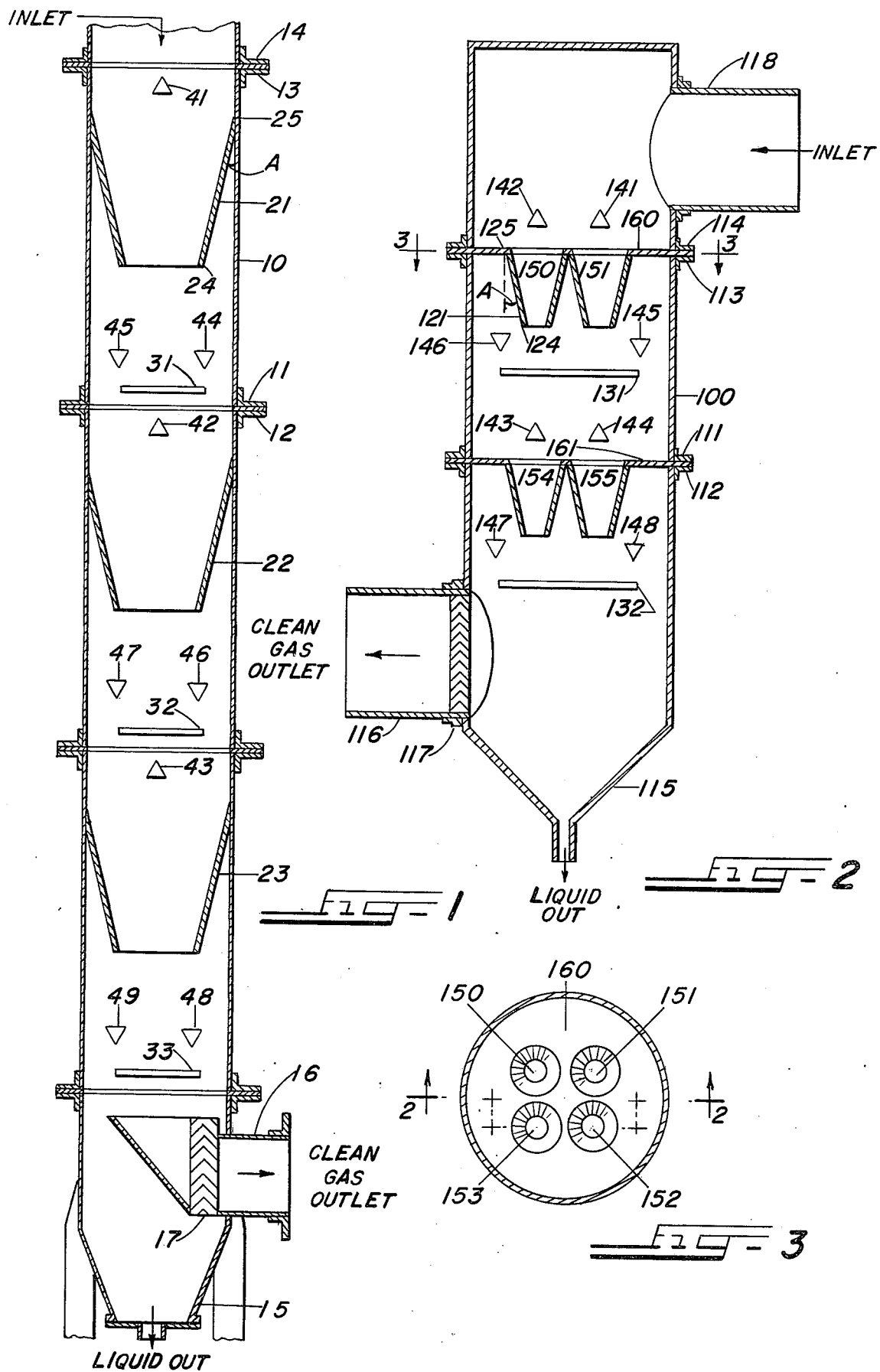

POLLUTION CONTROL APPARATUS AND METHOD

CROSS REFERENCE TO RELATED APPLICATION

This application is a continuation-in-part of my copending application, Ser. No. 252,914, filed May 12, 1972.

The general concern of the public and industry alike for the quality of the environment, particularly as expressed in modern pollution control laws, has intensified the search for more efficient and more economical means for controlling industrial effluvia. Special attention has been directed to the control of the discharge of undesirable gaseous and particulate pollutants into the atmosphere.

In the past, cyclone separators and bag collectors have been commonly employed for industrial pollution control for removal of undesired particulate matter. However, conventional cyclone separators do not achieve more than a moderate degree of particulate removal and are not considered effective in controlling emissions of pulverulent particles. Bag filters are of greater efficiency, even of finely divided solids, but are encumbered with the considerable expense of bag maintenance. Bag filters also exhibit declining efficiency as the bags fill in use and are incapable of handling hygroscopic or tacky particulates. Neither cyclone separators nor bag collectors have any effect upon undesired gaseous matter.

Electrostatic precipitators have also been utilized but these present disadvantages of electrical power utilization, expensive maintenance, high voltage and explosion hazards, corrosion problems due to necessary materials of construction, and cannot be used for low gaseous volume because of high initial investment. Electrosatic precipitators do not have any effect upon undesired gaseous pollutants.

Venturi gas scrubbers have also been used in attempts to obtain satisfactory industrial pollution control. It is generally recognized in the use of Venturi gas scrubbers that high gas flow velocities are necessary to obtain most effective particulate removal. However, at this level of removal, the pressure drop is so high tht energy consumption is wasteful and further increases in velocity are prohibitive. Even at the conventional velocities used, the Venturi section introduces a large pressure drop, in the order of 15 to 50 inches of water, resulting in large power consumption to maintain flow through the cleaning apparatus. Further, as speed of flow through the Venturi apparatus is increased, the reverse of agglomeration, disintegration, begins to take place increasingly, thereby increasing the small-sized particles passing out of the effluent stack.

Therefore, an object of the present invention is to provide an apparatus for removal of pollutants from a gas stream which is highly efficient and useful in a wide variety of applications.

A more general object of the invention is to provide an apparatus for removing pollutants from a gas stream which has a low pressure drop across the apparatus.

Another object of the invention is to provide an apparatus which is continuous in its operation and has a low gas velocity while removing sub-micron particles from a gas stream with high efficiency.

Still another object of the invention is to provide an apparatus which is self-cleaning and nonclogging.

An object of this invention is to provide an apparatus and method for removing noxious odors and undesired gases, such as $SO_x$, from polluted gas streams.

Another object of the invention is to provide an apparatus and method for high efficiency removal of particulates from high temperature gas streams where low vapor pressure liquids other than water, or even solids are used.

A further object of the invention is to provide an apparatus and method for agglomerating particles in gas streams which is efficient in both wet and dry operations.

Another object is to provide a method having high efficiency for removing pollutants down to submicron sizes from gas streams.

These and other objects and features of the invention will become more apparent from the following description and figures showing preferred embodiments wherein:

FIG. 1 shows a cross-sectional view of one embodiment of an apparatus of this invention using single nozzles in series;

FIG. 2 shows a cross-sectional view of another embodiment of an apparatus of this invention using multiple nozzle plates in series; and FIG. 3 shows a cross-sectional view of the apparatus of FIG. 2 at section 3—3.

Referring to FIG. 1, an apparatus of my invention for removing pollutants from stack effluvia is shown defined by outer casing 10. The cross-sectional shape of outer casing 10 is preferably cylindrical, but may be square, rectangular, triangular, hexagonal, or other symmetrical polygon shape, but other geometrical shapes symmetrical with respect to the axis of the apparatus are satisfactory, the principal requirement being that it enclose the apparatus in generally liquid and gas type relationship while providing controlled gas flow through the interior portion To allow maximum flexibility in the utilization and maintenance of the apparatus of my invention, it is preferred that casing 10 be in sections having flanges as shown by 11 and 13 at each end for rigid coupling to adjacent casing sections having like flanges 12 and 14. Instead of the flanges as shown in FIG. 1, any suitable coupling means may be utilized. FIG. 1 shows a three stage apparatus according to my invention.

The apparatus of my invention is arranged with its axis vertically having the pollutant containing gas inlet in the upper portion. The inlet may be either a vertical or horizontal position. The pollutant containing gas is supplied to the top of casing 10 through the inlet at a velocity and pressure sufficient to carry it through the apparatus. The apparatus is a low pressure apparatus and generally velocities may be in the range of about 400 to about 900 feet per minute.

Spray 41 may be located in the central portion of inlet to cylinder 10 and introduces liquid in droplet form to the pollutant air stream, the droplets being preferably in the order of about 40 to about 1500 microns in diameter. Larger droplets may be desired to compensate for evaporation when evaporative conditions exist. Spray 41 is preferably a solid cone spray which introduces droplets of water across the entire cross section of the pollutant gas stream prior to entry of the gas stream into cone 21. Different sized liquid droplets are desired to provide maximum differential accelerations, decelerations and velocities through the apparatus, thus increasing agglomeration. It is desired that the spray pattern extend across the full area of entrance 25 of nozzle 21 and any suitable pattern of sprays or multiple sprays is satisfactory. Spray 41 may also be used to introduce solid particles of the above specified sizes to the pollutant air stream at the entrance 25 of nozzle 21. While it is generally advantageous to utilize the sprays for introduction of liquid droplets or solid particles to the pollutant air stream, frequently with particulate pollutants, these sprays may be eliminated and the apparatus operated without introduction of additional particles or liquid dorplets.

The pollutant containing gas stream enters converging nozzle 21 through entry 25. It is preferred that the entry be round and the nozzle conical, but other geometrical shapes symmetrical with respect to the axis of the apparatus are satisfactory. The cone ratio, defined as the effective cross-sectional area of the entry divided by the effective cross-sectional area of the outlet, should be about 2 to about 12, about2 to about 5 being preferred. By effective cross-sectional area, I mean the area at 90° to the axis of gas flow.

The length of the converging portion of the nozzle is determined by the angle of convergence shown as A in FIG. 1 and the cone ratio as defined above. It is preferred that the mean angle of convergence be about 8° to about 18°, about 12° to about 16° being preferred. By mean angle of convergence, I mean the angle measured between a straight line drawn from the entry to the outlet and a vertical line as shown by A in FIG. 1. The sides of cone 21 do not need to be straight, but may be somewhat convex or concave. I have found that an angle greater than about 18° results in undesired flow pattern disturbance.

I have found that the diameter of outlet 24 should be about 1.3 to about 2.5 times the distance from outlet 24 to the impingement surface 31, about 1.6 to about 2.0 being preferred.

A suitable impingement plate is shown as 31 in FIG. 1. Impingement plate 31 is of sufficient size to have substantially all of the particulate matter from nozzle exit 24 impinge upon it while affording sufficient area between the impingement plate and cylinder 10 to allow passage of the gas around impingement plate without appreciable pressure drop. While impingement plate 31 is shown as a flat plate, a slightly concave plate to facilitate the passage of gas around the edges and to facilitate the removal of particulate matter may be utilized.

Sprays 44 and 45 may be suitably located above impingement plate 31 so that the spray therefrom washes particulate matter off impingement plate 31 for progress through the apparatus and discharge at the bottom. Sprays 44 and 45 may be multiple sprays located around the periphery of impingement plate 31 or a satisfactory spray may be located in the central position. When sufficient fluid is used, the impingement surface will be the fluid itself and the particulate matter will not strike or adhere to the impingement plate, but will be entrapped in the fluid. The essential criteria of the sprays upon impingement plate 31 is that they provide sufficient fluid with sufficient force and direction to keep impingement plate 31 relatively free of particulate matter. The apparatus may also be operated dry without the sprays to clean the impingement surfaces.

Because of the unitized construction of the apparatus of this invention, as shown in FIG. 1, multiple nozzle-impingement means stages may be readily placed one on top of the other, resulting in the series of three units as shown in FIG. 1. One to about 6 of the series connected stages of nozzles are suitable for an apparatus of this invention. Preferably 2 to 4 stages are utilized in series. The number of stages is controlled by the difficulty of removal of the pollutants and with especially difficult materials, a greater number of stages may be necessary.

Beneath the impingement plate of the bottom stage is reservoir 15 for removal of the liquid containing the undesired particulate or chemical matter and means for its removal. The liquid containing the undesired particulate matter may be filtered by filtration or settling methods well known to the art and the clean liquid returned to the liquid spray nozzles of the apparatus. Exit means for the removal of the clean gas are also provided beneath the bottom-most impingement plate 33 and shown in FIG. 1 as conduit 16. Either within the apparatus or external to the apparatus it is preferred to have demister 17 in the clean gas effluent line to remove fine droplets of liquid remaining in the gas stream together with any solids or gases trapped by such droplets.

The vertical arrangement of the converging nozzles 21, 22 and 23 is particularly advantageous since I have found that using such an apparatus with a demister having a cone ratio of 4 and a cone angle of 15°, the pressure drop in one cone is 3.5 inches of water; with two cones in series is 5.7 inches of water; with three cones in series is 7.0 inches of water; and with four cones in series is 8.3 inches of water. Thus, it is seen that the pressure drop of the vertical series of nozzles is advantageously less than cumulative.

The second and third stages, as shown in FIG. 1, are identical to the first stage; cones 22 and 23 corresponding to 21; sprays 42 and 43 corresponding to 41; sprays 46 and 47 and 48 and 49 corresponding to 44 and 45; and impingement plates 32 and 33 corresponding to 31.

The liquid supplied to nozzles 41, 42 and 43 as shown in FIG. 1 may be water if it is merely desired to induce higher rates of agglomeration or may be various chemicals for reaction with components of the gas stream. The chemical reaction of such liquid with undesired components of the gas stream, may be for the purpose of rendering such undesired components insoluble and thus more readily removed, or the reaction may be such as to render such undesired components less noxious. For high temperature operation low vapor pressure oils may be used. In instances where only solids removal is concerned, particulates rather than liquid droplets may be introduced to promote higher rates of agglomeration. In either case, the passing of the liquid reactant in the gas stream through gas nozzles such as 21, promotes intimate contact between the liquid reactant and the particulate or gaseous reactant to result in desired high reaction rates.

It is believed the high efficiency of the apparatus and process of my invention is due to differential velocities and differential acceleration and deceleration achieved by the combination of non-compressible matter passing with the compressible gas through nozzle 21 with the opportunity for relatively great expansion followng exit from nozzle exit 24. In the pollutant containing gas stream there is a size range of compressible and non-compressible matter. Additional particles added to the gas stream by addition of solids or liquid droplets are principally non-compressible as desired to increase the non-compressible component of the gas stream. Spray 41 may be used to introduce a wide selection of liquid or solid particle sizes to the gas stream and together with a relatively wide span of liquid or solid particle sizes in the inlet gas stream, promote extremely high collision rates resulting in very highly efficient agglomerations.

In order to minimize the height of the apparatus of my invention as shown in FIG. 1, I have found that multiple cones may be placed in each stage as shown in FIGS. 2 and 3. The embodiment as shown in FIGS. 2 and 3 show outer casing 100 which is substantially liquid and gas tight having polluted gas inlet 118 in the upper portion. Casing 100 may have flanges as shown by 111 and 113 at each end for coupling to adjacent casing sections having like flanges 112 and 114.

The upper stage as shown in FIGS. 2 and 3 has plate 160 through which gas nozzles 150, 151, 152 and 153 are arranged. FIG. 3 shows the cross-sectional arrangement of the four nozzles mounted on plate 160. Any number of gas nozzles which have the properties as previously set forth, are suitable, from about 2 to about 6 being preferred in a single stage.

In a similar manner to that previously described, liquid or solid particles may be added by sprays above the gas nozzle inlets, such as spray 142 above the inlet 125 to nozzle 150.

The pollutant containing gas stream passes through the converging nozzles to an impingement surface beneath the nozzle exits as exemplified by exit 124 of nozzle 150. As previously described, the impingement surface may be an impingement plate shown in FIG. 2 as 131 and may have liquid sprays to aid washing particulate matter off the impingement plate as shown in FIG. 2 as 145 and 146.

Similar to the apparatus shown in FIG. 1 beneath the lowest impingement surface is reservoir 115 for removal of liquid containing undesired particulate and/or chemical matter and means for its removal. Exit means 116 are shown in FIG. 2 for removal of the clean gas from below the lower impingement surface shown as 132. A demister shown as 117 is preferred when the apparatus is utilized with liquid sprays to remove fine droplets of liquid remaining in the clean gas. The second stage is shown identical to the first or upper stage.

With the unitized construction of the apparatus of this invention, multiple units may readily be placed on top of one another resulting in a series of two units as shown in FIG. 2. One to about six of the series connected stages of multiple nozzles are suitable for an apparatus of this invention, preferably 2 to 4 nozzle-impingement means stages are utilized in series.

The process of my invention for removing pollutants from gas streams comprises: passing the pollutant containing gas stream into the upper portion of a vertical casing; passing the pollutant containing gas stream through a nozzle within the casing and having an entry in communication with the polluted gas inlet, the entry having an effective cross-sectional area of about 2 to about 12 times the effective cross-sectional area of the outlet and the mean angle of convergence of the nozzle being about 8 to about 18°, to acceleration and deceleration of the gas stream causing particulates to agglomerate and causing chemical reaction of reactants in passing through the nozzle; impinging the agglomerates upon an impingement means beneath the nozzle outlet; removing the liquid and particulate matter from the lower portion of the casing; and separately removing the clarified gas from the lower portion of the casing.

The following examples are intended as illustrations of various embodiments of my invention which should not be limited thereby.

EXAMPLE I

Using an apparatus similar to that shown in FIG. 1 having two cones with cone angles of 15°; cone entrance diameters of 12 inches; cone exit diameters of 6 inches; impingement distance of 10 inches; and gas velocity of 1500 cubic feet per minute, the following results were obtained with the noted pollutant materials and are shown in Table I.

TABLE I

| Pollutant Material | Size | Water Sprays Cone | Water Sprays Plate | Pressure Drop inches water | Grain Loading in grains per cubic foot In | Grain Loading in grains per cubic foot Out | Efficiency of Removal Percent |
| --- | --- | --- | --- | --- | --- | --- | --- |
| Keystone Coal Dust | 98%<74 microns | Both Solid | Solid Upper Only | 5.7 | 1.145 | 0.00876 | 99.2 |
| Keystone Coal Dust | " | " | None | 5.6 | 0.990 | 0.00879 | 99.1 |
| Keystone Coal Dust | " | " | " | 6.3 | 1.198 | 0.0123 | 99.0 |
| Soybean Flour | 77%<400 microns 77%<7 microns 20%<1 micron | Both | Upper Only | 5.5 | 0.459 | 0.0128 | 97.2 |
| Calciner Fines | 8½%<0.6 " 4%<0.4 " | Both | None | 6.4 | 0.593 | 0.0082 | 98.6 |
| Hydrated Lime Dust | | Both | Upper Only | 5.8 | 4.35 | 0.0390 | 99.1 |
| Pulp Dust | | Both | Upper Only | 5.6 | 1.143 | 0.0016 | 99.9 |

EXAMPLE II

Using an apparatus as shown in FIGS. 2 and 3 having two stages of four cones each having cone angles of 15°; cone entrance diameters of 6 inches; cone exit diameters of 3 inches; impingement distance of 5 inches; and gas velocity of 1500 cubic feet per minute, the following results were obtained with the noted pollutant materials and are shown in Table II.

TABLE II

| Pollutant Material | Size | Water Sprays Cone | Water Sprays Plate | Pressure Drop inches water | Grain Loading in grains per cubic foot In | Grain Loading in grains per cubic foot Out | Efficiency of Removal Percent |
| --- | --- | --- | --- | --- | --- | --- | --- |
| Keystone Coal Dust | 98%<74 microns | 8 cone sprays | Upper only | 6.1 | 1.158 | 0.022 | 98.1 |

TABLE II-continued

| Pollutant Material | Size | Water Sprays Cone | Water Sprays Plate | Pressure Drop inches water | Grain Loading in grains per cubic foot In | Grain Loading in grains per cubic foot Out | Efficiency of Removal Percent |
|---|---|---|---|---|---|---|---|
| Keystone Coal Dust | " | " | " | 6.0 | 1.114 | 0.021 | 98.1 |
| Soybean Flour Dust | 77% <400 microns | " | " | 6.0 | 0.765 | 0.019 | 97.5 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A low pressure drop apparatus for removing pollutants from gas streams comprising:
   a vertical casing which is substantially liquid and gas tight having a polluted gas inlet in the upper portion;
   a nozzle within said casing having an entry at the upper end in communication with said polluted gas inlet and an outlet at the lower end, said entry being in substantially closed relation to said casing to avoid substantial bypass of said nozzle and having an effective cross-sectional area of about 2 to about 12 times the effective cross-sectional area of said outlet and the mean angle of convergence of said nozzle being about 8° to about 18°;
   impingement plate below said nozzle outlet at a distance from said outlet to insure impingement thereon of substantially all particulate matter entrained in the gas stream passing from said nozzle outlet, said impingement plate having a smaller area than the cross section of said casing thereby allowing the gas stream to pass to a lower portion of said casing around the periphery of said impingement plate;
   means for removing liquid and particulate matter from the lower portion of said casing; and
   means for separately removing the clarified gas from the lower portion of said casing.

2. The apparatus of claim 1 wherein said entry has an effective cross-sectional area of about 2 to about 5 times the effective cross-sectional area of said outlet.

3. The apparatus of claim 1 wherein said mean angle of convergence is about 12° to about 16°.

4. The apparatus of claim 1 wherein the diameter of said outlet is about 1.3 to about 2.5 times the distance from said outlet to said impingement means.

5. The apparatus of claim 1 wherein 2 to 6 nozzle-impingement plate stages are connected in series within said vertical casing.

6. The apparatus of claim 1 wherein a spray means introduces liquid in droplet form to the pollutant containing gas stream prior to said nozzle.

7. The apparatus of claim 6 wherein said droplets are about 40 to about 1500 microns in diameter.

8. The apparatus of claim 1 wherein a spray means introduces solid particles to the pollutant containing gas stream prior to said nozzle.

9. The apparatus of claim 7 wherein said particles are about 40 to about 1500 microns in diameter.

10. The apparatus of claim 1 having from 2 to about 6 of said nozzles in each vertical stage.

11. The apparatus of claim 10 wherein 2 to 4 nozzle-impingement plate stages are connected in series within said vertical casing.

12. A process for removing pollutants from gas streams comprising:
    passing the pollutant containing gas stream into the upper portion of a vertical casing;
    passing the pollutant containing gas stream through a nozzle within the casing and having an entry in communication with the polluted gas inlet, the entry having an effective cross-sectional area of about 2 to about 12 times the effective cross-sectional area of the outlet and the mean angle of convergence of the nozzle being about 8° to about 18°, the acceleration and deceleration of the gas stream causing particulates to agglomerate in passing through the nozzle;
    impinging the agglomerates upon an impingement plate beneath the nozzle outlet;
    passing the gas stream around the periphery of said impingement plate to a lower portion of said casing;
    removing the liquid and particulate matter from the lower portion of the casing; and
    separately removing the clarified gas from the lower portion of the casing.

13. The process of claim 12 wherein said pollutant containing gas is passed through 2 to 6 nozzle-impingement plate stages connected in series within said vertical casing.

14. The process of claim 12 with the added step of introducing liquid in droplet form to the pollutant containing gas stream prior to introducing said pollutant containing gas stream into said nozzle.

15. The process of claim 14 wherein said droplets are from about 40 to about 1500 microns in diameter.

16. The process of claim 12 with the added step of introducing solid particles to the pollutant containing gas stream prior to introducing said pollutant containing gas stream into said nozzle.

17. The process of claim 16 wherein said particles are from about 40 to 1500 microns in diameter.

18. The process of claim 12 wherein said pollutant containing gas stream is passed through 2 to about 6 of said nozzles in each vertical stage within said vertical casing.

19. The process of claim 18 wherein 2 to 4 nozzle-impingement plate stages are connected in series within said vertical casing.

* * * * *